Aug. 25, 1925.  W. R. SMITH  1,550,986
LEVER MOUNTING
Filed Oct. 11, 1923
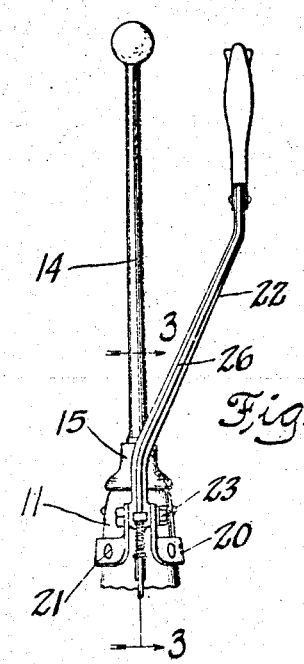
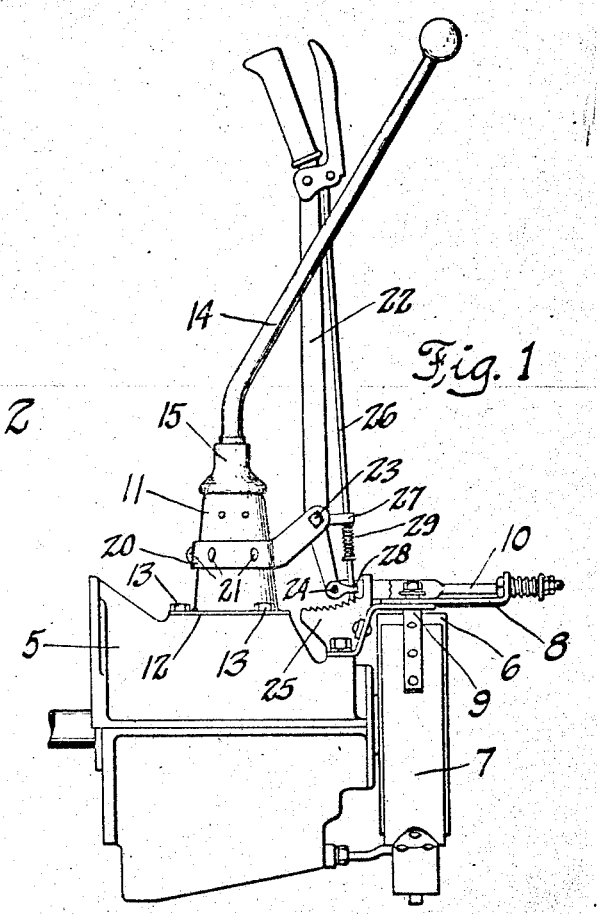

Patented Aug. 25, 1925.

1,550,986

UNITED STATES PATENT OFFICE.

WILLIAM R. SMITH, OF TOLEDO, OHIO, ASSIGNOR TO GENERAL MOTORS CORPORATION, OF DETROIT, MICHIGAN, A CORPORATION OF DELAWARE.

LEVER MOUNTING

Application filed October 11, 1923. Serial No. 667,877.

*To all whom it may concern:*

Be it known that I, WILLIAM R. SMITH, a citizen of the United States, and a resident of Toledo, county of Lucas, and State of Ohio, have invented certain new and useful Improvements in Lever Mountings, of which the following is a full, clear, concise, and exact description, such as will enable others skilled in the art to which the invention relates to make and use the same, reference being made therein to the accompanying drawings, which form a part of this specification.

The invention relates to improved means for supporting levers in position for convenient manipulation. It is especially applicable to and will be herein described in connection with the mounting of a brake lever in association with a gear shifting lever upon a transmission housing of the type ordinarily employed in motor vehicles. In the form illustrated, the brake lever is arranged to actuate a brake of the type ordinarily known as a transmission brake in which the braking elements are associated directly with the transmission mechanism of the vehicle.

In the accompanying drawings, illustrating one embodiment of the invention,

Fig. 1 is a side elevation of a motor vehicle transmission mechanism having the invention associated therewith;

Fig. 2 is an end view of a portion of the structure shown in Fig. 1;

Fig. 3 is a section on line 3—3 of Fig. 2; and Fig. 4 is a section on line 4—4 of Fig. 3.

Referring to the drawings, 5 indicates a housing or casing which may be of conventional character adapted to enclose and support any usual or suitable form of change speed mechanism, not shown. Connected in any suitable manner to a driven shaft of this mechanism is a brake drum 6 with the peripheral surface of which the braking element 7 is adapted to engage. The braking element may be caused to engage with the brake drum by any desired mechanism, as by a cam plate 8 cooperating with one or more lugs 9 secured to the braking element 7, the plate being actuated by a rod 10. The specific features of this braking mechanism form no part of the present invention and are made the subject matter of an application of O. E. Hunt, filed April 20, 1923, S. N. 633,471.

Upon the upper side of the transmission casing 5 is mounted a dome 11, which is preferably of sheet metal pressed or drawn in to the desired shape. It is provided at its base with a flange 12 adapted to be secured to the casing 5 as by bolts 13. The dome 11 is centrally apertured at its upper end to admit therethrough the gear shifting lever 14, the lower end of which extends within the transmission casing for actuation of suitable gear shifting mechanism in the usual manner. The lever 14 is supported upon the dome for universal movement, as by a cap member 15 secured to the lever and a spherical washer 16 surrounding the lever on the inner side of the dome. A spring 17 operating between the washer 16 and a fixed abutment 18 upon the lever serves to maintain the parts in proper position.

Mounted upon the dome 11 is a bracket 20 which, as in the form illustrated, may comprise a strap or band shaped to fit the exterior surface of the dome 11 and secured thereto, as by rivets 21, the free ends of the band being bent to a suitable position to provide a support for the brake lever 22. As illustrated, the lever 22 is positioned between the free ends of the band or bracket 20 and is supported thereon for pivotal movement, as by a pivot bolt 23. The lower end of the lever 22 is suitably connected to the brake actuating element 10, as by a bolt or pin 24. Means may be provided to maintain the lever 22 in adjusted position, which means may comprise a notched segment 25 secured to the transmission casing and adapted to cooperate with a detent 26 operating in guides 27, 28 secured to or integral with the lever. A spring 29 may be mounted upon the detent 26 between the guide 27 and an abutment 30 fixed to the detent.

The movement of lever 14 is restricted to forward and rearward or sidewise swinging movements, as is customary in gear shifting mechanism embodying sliding gears. Rotative movement about its longitudinal axis is prevented in the present instance by a pin 31 extending transversely through the lever within the dome 11 at approximately the geometrical center of the spherical portion of the dome, the ends of which pin are confined to vertical travel by guides 32, 33. These guides, as shown, comprise channel pieces suitably secured as by riveting or spot welding, to the inner surface of dome 11.

In order to avoid interference between the lever 14 and the lever 22, the latter is arranged at an angle or is bent or deflected as illustrated in Fig. 2 to bring it out of the path of movement of the lever 14. By this means, although the lower end of the lever 22 is fulcrumed to swing in the central vertical plane of the mechanism with which it is associated, which in the present instance is the central plane of the transmission mechanism or of the vehicle in which such mechanism is mounted, the handle portion of the lever is so positioned that it may be conveniently grasped by the operator without in any way interfering with or being affected by the operation of the lever 14 since its path of movement lies to one side of the path of the handle portion of lever 14.

It will be noted that the lever mounting described comprises an assemblage of parts of extreme simplicity in arrangement and form and capable of being manufactured at a very low cost, while in operation the structure is highly efficient.

The construction is also of particular advantage in case the brake lever may be required to be positioned on either side of the transmission lever, as in providing for right or left hand drive in an automobile. By merely changing the direction of deflection of the bent lever the handle portion may be brought to either side of the other lever without requiring any modification whatever of the lever support, the chassis, or the brake connections.

Although the invention has been described herein as applied to a transmission mechanism associated with the transmission brake, and as embodying certain specific details of construction, it will be understood that the invention is not intended to be restricted to such specific details except as required by the language of the appended claims in view of the prior art.

1. In a lever support, the combination with a casing element, a lever mounted thereon and extending to the interior of said element, a bracket comprising a band surrounding and secured to said element and a second lever mounted upon said bracket.

2. In a lever support, the combination with a casing, a lever mounted centrally of said casing and extending thereinto, a bracket supported on said casing, and a second lever mounted upon said bracket in position to swing in a plane including the pivot of the first lever, the handle portion of the second lever being deflected to avoid interference with said first lever.

3. The combination with a gear casing of a pressed metal dome secured to one side of said casing, a lever mounted upon said dome and extending therethrough into said casing, a bracket surrounding said dome and secured thereto, and a second lever mounted upon said bracket.

4. The combination with a motor vehicle transmission casing of a dome secured to the top thereof, a gear shifting lever mounted upon said dome and extending therethrough into said casing, a bracket comprising a band fitted to the exterior of said dome and secured thereto, a second lever mounted upon said bracket, and brake mechanism arranged to be actuated by said second lever.

5. The combination with a casing of a dome fixed thereon, a bracket comprising a strap or band surrounding said dome and secured thereto, the free ends of said strap or band being arranged to support a lever, and a lever fulcrumed upon said ends.

6. The combination with a transmission casing of a dome fixed thereon, a band fitting the exterior of said dome and secured thereto, the free ends of said band being bent into juxtaposition to each other, and a lever fulcrumed upon said ends to swing substantially in the central plane of the dome.

7. The combination with a casing of a dome thereon, a lever mounted upon said dome and extending into said casing, a bracket supported upon said dome, and a second lever fulcrumed upon said bracket and arranged to swing substantially in the plane of the first mentioned lever, said second lever being deflected laterally to bring the path of movement of its handle portion outside the path of the handle portion of the first mentioned lever.

8. The combination with a motor vehicle transmission casing of a brake, a pressed metal dome mounted upon said casing, a gear lever fulcrumed upon said dome and extending into said casing, a bracket secured to said dome, and a lever arranged to actuate said brake and mounted upon said bracket with its fulcrum substantially in the same plane longitudinally of the vehicle with said gear lever, the handle portion of the brake lever being deflected laterally so as to swing in a plane to one side of the path of said gear lever.

9. A gear lever mounting comprising a transmission housing, a centrally apertured pressed sheet metal dome mounted thereon, a lever extending through said aperture, a cap upon said lever fitting the exterior of said dome, spring means acting between said dome and said lever to maintain the lever seated upon the dome, guide means mounted upon the interior of said dome, and projections on said lever cooperating with said guide means to prevent rotative movement of said lever about its longitudinal axis.

10. A lever mounting comprising a centrally apertured dome, a lever extending through said aperture and supported upon said dome for oscillatory movement, and means for preventing rotative movement of said lever about its longitudinal axis comprising channel members carried by said dome and projections on said lever engaging said channel members.

In testimony whereof I affix my signature.

WILLIAM R. SMITH.